US009518821B2

(12) United States Patent
Malay (10) Patent No.: US 9,518,821 B2
(45) Date of Patent: Dec. 13, 2016

(54) VEHICLE CONTROL SYSTEM

(71) Applicant: Benjamin Malay, Centreville, VA (US)

(72) Inventor: Benjamin Malay, Centreville, VA (US)

( * ) Notice: Subject to any disclaimer, the term of this patent is extended or adjusted under 35 U.S.C. 154(b) by 0 days.

(21) Appl. No.: 13/957,873

(22) Filed: Aug. 2, 2013

(65) Prior Publication Data

US 2014/0297067 A1    Oct. 2, 2014

Related U.S. Application Data

(60) Provisional application No. 61/678,914, filed on Aug. 2, 2012.

(51) Int. Cl.
| | | |
|---|---|---|
| *B64C 19/00* | (2006.01) | |
| *G01C 9/00* | (2006.01) | |
| *B64C 13/18* | (2006.01) | |
| *B64C 13/20* | (2006.01) | |
| *B64C 39/02* | (2006.01) | |

(Continued)

(52) U.S. Cl.
CPC ............. *G01C 9/005* (2013.01); *A63H 27/02* (2013.01); *A63H 30/04* (2013.01); *B64C 13/18* (2013.01); *B64C 13/20* (2013.01); *B64C 39/024* (2013.01); *G01C 21/20* (2013.01); *G05D 1/0022* (2013.01); *B64C 2201/141* (2013.01); *B64C 2201/146* (2013.01); *Y02T 50/44* (2013.01)

(58) Field of Classification Search
CPC .......... B60N 2/002; H04W 4/04; G08C 17/02; G08C 2201/93; H04M 1/72533; H04M 1/6091; H04B 7/00

See application file for complete search history.

(56) References Cited

U.S. PATENT DOCUMENTS 5,576,727 A * 11/1996 Rosenberg ............ G01B 5/008
                                                  345/161
6,169,939 B1 * 1/2001 Raad ................ B60G 17/01908
                                                  280/5.508

(Continued)

FOREIGN PATENT DOCUMENTS

| CN | 101886927 A | * | 11/2010 | |
|---|---|---|---|---|
| CN | 101886927 B | * | 8/2012 | |
| WO | WO 2010095119 A1 | * | 8/2010 | ............... G07C 5/00 |

OTHER PUBLICATIONS

"3D Robotics UAV Technology: PhoneDrone Board for Android", accessed on the Internet Jan. 31, 2014 <http://store.3drobotics.com/products/phonedrone-board-for-android>, copyright 2013 (3 pages).

(Continued)

*Primary Examiner* — Jean-Paul Cass
(74) *Attorney, Agent, or Firm* — Winthrop & Weinstine, P.A.

(57) ABSTRACT

A vehicle control system may include a vehicle frame, a mount secured to the vehicle frame and configured for rigidly securing a smartphone therein such that motions experienced by the vehicle frame are correspondingly experienced by the smartphone, and system electronics arranged on the frame and in communication with the smartphone and vehicle controllers, the system electronics configured to receive signals from the smartphone and control directional devices of the vehicle based on the signals via the vehicle controllers. A system for preparing signals for transmission to the vehicle to control navigation may also be provided.

24 Claims, 6 Drawing Sheets

(51) Int. Cl.
*A63H 30/04* (2006.01)
*A63H 27/00* (2006.01)
*G01C 21/20* (2006.01)
*G05D 1/00* (2006.01)

(56) References Cited

U.S. PATENT DOCUMENTS

| | | | | |
|---|---|---|---|---|
| 6,445,983 | B1 | 9/2002 | Dickson et al. | |
| 7,979,172 | B2* | 7/2011 | Breed | G08G 1/161 701/117 |
| 8,035,508 | B2* | 10/2011 | Breed | B60C 11/24 340/539.11 |
| 8,255,092 | B2* | 8/2012 | Phillips | G05D 1/0088 348/113 |
| 8,339,364 | B2* | 12/2012 | Takeda | A63F 13/06 345/158 |
| 8,447,440 | B2* | 5/2013 | Phillips | G05D 1/0088 348/113 |
| 8,577,535 | B2* | 11/2013 | Cummings | G06F 3/04815 701/2 |
| 8,588,972 | B2* | 11/2013 | Fung | B25J 11/003 446/454 |
| 8,688,313 | B2* | 4/2014 | Margol | G06F 8/61 701/31.4 |
| 8,868,377 | B2* | 10/2014 | Yuen | A61B 5/0002 702/160 |
| 2005/0146458 | A1 | 7/2005 | Carmichael | G01S 13/867 342/52 |
| 2008/0161987 | A1* | 7/2008 | Breed | G08G 1/161 701/27 |
| 2008/0215183 | A1* | 9/2008 | Chen | G06N 3/008 700/245 |
| 2009/0005167 | A1* | 1/2009 | Arrasvuori | A63H 33/042 463/40 |
| 2009/0037033 | A1* | 2/2009 | Phillips | G05D 1/0088 701/2 |
| 2009/0294573 | A1* | 12/2009 | Wilson | B64C 39/024 244/2 |
| 2011/0043445 | A1* | 2/2011 | Kao | G06F 1/1694 345/156 |
| 2011/0139923 | A1* | 6/2011 | Papanikolopoulos | A63H 27/12 244/2 |
| 2011/0246015 | A1* | 10/2011 | Cummings | G06F 3/04815 701/23 |
| 2011/0288684 | A1* | 11/2011 | Farlow | B25J 11/009 700/264 |
| 2012/0028680 | A1* | 2/2012 | Breed | B60C 11/24 455/556.1 |
| 2012/0121161 | A1* | 5/2012 | Eade | G09B 29/007 382/153 |
| 2012/0166024 | A1* | 6/2012 | Phillips | G05D 1/0088 701/2 |
| 2012/0252364 | A1* | 10/2012 | Inabathuni | G08C 17/02 455/41.2 |
| 2013/0019019 | A1* | 1/2013 | Lam | H04L 67/34 709/226 |
| 2013/0229569 | A1* | 9/2013 | Bevirt | F16M 11/12 348/373 |
| 2013/0271579 | A1* | 10/2013 | Wang | G01B 11/002 348/47 |
| 2014/0135062 | A1* | 5/2014 | Bevirt | F16M 11/041 455/556.1 |
| 2014/0171238 | A1* | 6/2014 | Bay | F41G 1/35 473/570 |
| 2015/0163345 | A1* | 6/2015 | Cornaby | G06F 3/04847 345/633 |

OTHER PUBLICATIONS

"APM Autopilot Suite", accessed on the Internet Jan. 31, 2014 <http://ardupilot.com> (2 pages).

"Deadfalkon: PhoneDroneAndroidControl", accessed on the Internet Jan. 31, 2014 <https://github.com/deadfalkon/PhoneDroneAndroidControl> (1 page).

"OpenPilot: The Next Generation Open Souce UAV Autopilot", accessed on the Internet Jan. 31, 2014 <http://www.openpilot.org>, copyright 2013 (2 pages).

"Paparazzi Unmanned Aircraft Systems Overview", accessed on the Internet Jan. 31, 2014 <http://wiki.paparazziuav.org/wiki/Overview> (12 pages).

"Parrot® AR Drone 2.0", accessed on the Internet Jan. 31, 2014 <http://ardrone2.parrot.com>, copyright 2013 (10 pages).

"PhoneSat", Wikipedia, accessed on the Internet Jan. 31, 2014 <http://en.wikipedia.org/wiki/PhoneSat> (3 pages).

"PIXHAWK Computer Vision on Autonomous Aerial Robots", accessed on the Internet Jan. 31, 2014 <https://pixhawk.ethz.ch> (6 pages).

Anderson, Chris. "How I Accidentally Kickstarted the Domestic Drone Boom", Wired, Jun. 22, 2012, accessed on the Internet Jan. 31, 2014 <http://www.wired.com/dangerroom/2012/06/ff_drones/all/> (9 pages).

Chandler, David L. "Using a phone to fly a drone", MIT News, MIT News Office, Nov. 8, 2011, accessed on the Internet Feb. 3, 2014 <http://web.mit.edu/newsoffice/2011/iphone-drone-control-1108.html> (2 pages).

Metz, Rachel. "Drone Gets Its Smarts from a Smartphone", MIT Technology Review, Dec. 12, 2013, accessed on the Internet Jan. 31, 2014 <http://www.technologyreview.com/news/522416/drone-gets-its-smarts-from-a-smartphone> (2 pages).

"USBTenki: USB Atmospheric pressure sensor (Barometer) Product Page," Dracal Technologies, copyright 2013-2014, accessed on the Internet Jun. 24, 2014, URL: <http://www.dracal.com/store/products/pth_01_p/index.php> (2 pages).

"Yocto-Servo Product Page," accessed on the Internet Jun. 24, 2014 URL: <http://www.yoctopuce.com/EN/products/usb-actuators/yocto-servo> (2 pages).

Nelson, Robert C. "Chapter 8: Application of Classical Control Theory to Aircraft Autopilot Design", Flight Stability and Automatic Control, Second Edition, copyright 1998 (pp. 281-322).

Malay, Benjamin Peter. "Stellar-aided inertial navigation systems on the surface of Mars", Master of Science in Engineering Thesis, University of Texas at Austin, OCLC-52770085, May 2003 (101 pages).

* cited by examiner

VEHICLE CONTROL SYSTEM

CROSS REFERENCE TO RELATED APPLICATIONS

The present application claims priority to U.S. Provisional Application No. 61/678,914 entitled Smartphone Unmanned Aircraft System and Methods and Systems for Using Same, filed on Aug. 2, 2012, the content of which is hereby incorporated by reference in its entirety.

FIELD OF THE INVENTION

The present disclosure is related to an autonomous control system. More particularly, the present disclosure is related to an autonomous control system for controlling a vehicle such as an aircraft, automobile, watercraft, military vehicle or device or other mobility device. Still more particularly, the present disclosure is related to an autonomous control system having a smartphone secured within a vehicle and configured to control the vehicle.

BACKGROUND

Designs of autonomous vehicles such as unmanned aircraft systems (UAS) are seeing rapid growth in both variety and capability. Non-military UAS functionality has, until recently, been limited to radio-controlled (RC) aircraft being used as platforms to carry a sensor such as a digital camera that is connected to a ground station via a secondary line-of-sight radio data link.

Separate from autonomous vehicle developments, smartphones have seen remarkable advancements in recent years. For example, low cost and high performance components such as integrated accelerometers, gyroscopes, magnetometers, central processing unit (CPU) chips, touchscreens, high definition digital cameras, open software development kits, and global cellular broadband networks have enabled rapid adoption of the modern smartphone.

Components similar to those developed for the smartphone have also been used to advance the field of robotics and physical computing. The resultant state of the art of small UAS design may be said to reflect a merger of the world of RC aircraft with robotics through the use of microelectronics and integrated circuit boards.

Small modern UAS designs may include airplanes, helicopters, quadcopters, and multicopters. Commercial examples include the ArduPilot Mega system, PIXHAWK, and Parrot AR.Drone. These designs are commonly based upon custom designed solutions using uniquely integrated electronic board components. While these unique integrations may be lightweight, customized, and possibly offer better performance, the unique integration may make the systems very inflexible and, as such, a particular design may be capable of some activities and not others. For example, many designs contain autopilots and are capable of autonomous operation. Some designs can be controlled by touchscreen and tilt-controlled devices such as tablets or smartphones. Other designs carry payloads or sensors but usually require a secondary data link, and sensors cannot easily be changed or modified by the average user. Some designs can be controlled through a Wi-Fi signal by a user within line of sight or across the internet. Some designs have demonstrated use of a smartphone to control a small subset of systems inside an airframe such as the servos, but there are limits to the control provided by the smartphone.

Even with the unique integrations, it does not appear that any non-military UAS designs are capable of over-the-horizon controlled flight. Still further, many, if not all, UAS designs are severely limited in urban environments due to buildings and obstructions obscuring line-of-sight to the controller. Typically, the most capable prior art designs are the most difficult and expensive to build and operate while the easiest to use designs are the least capable and flexible.

Current aviation rules require a special permit from the Federal Aviation Administration (FAA) for over-the-horizon flight and non-private uses of unmanned aircraft. However, new FAA rules are due to be released that will allow regular commercial application of UAS technology in the United States. As such, the UAS market is poised to grow exponentially beyond the world of hobbyists, military, and law enforcement and into the commercial sector. Flexible UAS designs (i.e., as opposed to the inflexible unique integrations discussed above) will allow operators to perform a multitude of tasks including remote sensing, precision surveying, surveillance, cargo carrying, and missions too dangerous or mundane for human presence. A capable, flexible, and low cost UAS architecture for use in the commercial sector and beyond is needed.

SUMMARY

In one embodiment, a vehicle control system may include a vehicle frame and a mount secured to the vehicle frame and configured for rigidly securing a smartphone therein such that motions experienced by the vehicle frame are correspondingly experienced by the smartphone. The vehicle control system may also include system electronics arranged on the frame and in communication with the smartphone and vehicle controllers. The system electronics may be configured to receive signals from the smartphone and control directional devices of the vehicle based on the signals via the vehicle controllers.

In another embodiment, a vehicle control system may include a computing device comprising a computer readable storage medium, a processor, a user interface and an output and comprising an accelerometer, a gyroscope, a magnetometer, and a barometer. The system may also include computer implemented instructions configured for controlling navigation of the vehicle performable by the processor and stored on the computer readable storage medium. The instructions may further be configured for electrically receiving information sensed by one of the accelerometer, the gyroscope, the magnetometer, and the barometer and configured for preparing signals for transmission to the vehicle to control navigation of the vehicle.

DETAILED DESCRIPTION

The present disclosure, in some embodiments, relates to a smartdrone unmanned vehicle and, in particular, to a smartdrone unmanned aircraft system (SUAS) involving a smartphone attached to a rigid mount on the aircraft and having physical and electrical interfaces to the aircraft. The smartphone may include software configured to control the system and a software-defined inertial navigation system (INS) using the smartphone's accelerometers, gyroscopes, magnetometer, barometer, and GPS. The system may also include control and data links between the aircraft and the user. The inherent capability of modern smartphones and the broadband wireless networks that service them may allow the SUAS to be capable of autonomous and controlled over-the-horizon and non-line-of-sight flight. In addition, the smartphone camera may also provide a useful organic remote sensing capability without the addition of further devices and/or another data link. In some embodiments, the mentioned software to control the system may be downloaded off of the Internet through existing commercial "app" stores and may be relatively easily upgradeable. The user/electrical/communication interfaces may be compatible with most radio controlled aircraft components and airframes. As such, a simple update of software on the smartphone may allow for control of almost any airframe including airplanes, helicopters, quadcopters, and multicopters by swapping the mount between airframes.

The disclosed system may be advantageous by being flexible and upgradeable thereby increasing the ease of use of UAS's. The disclosed system may, thus, replace difficult to program, uniquely integrated, and expensive circuit board approaches. Still further, the abundant presence and high ownership levels of smartphones may make this system easy to implement with a low capital expense.

Figure 1:
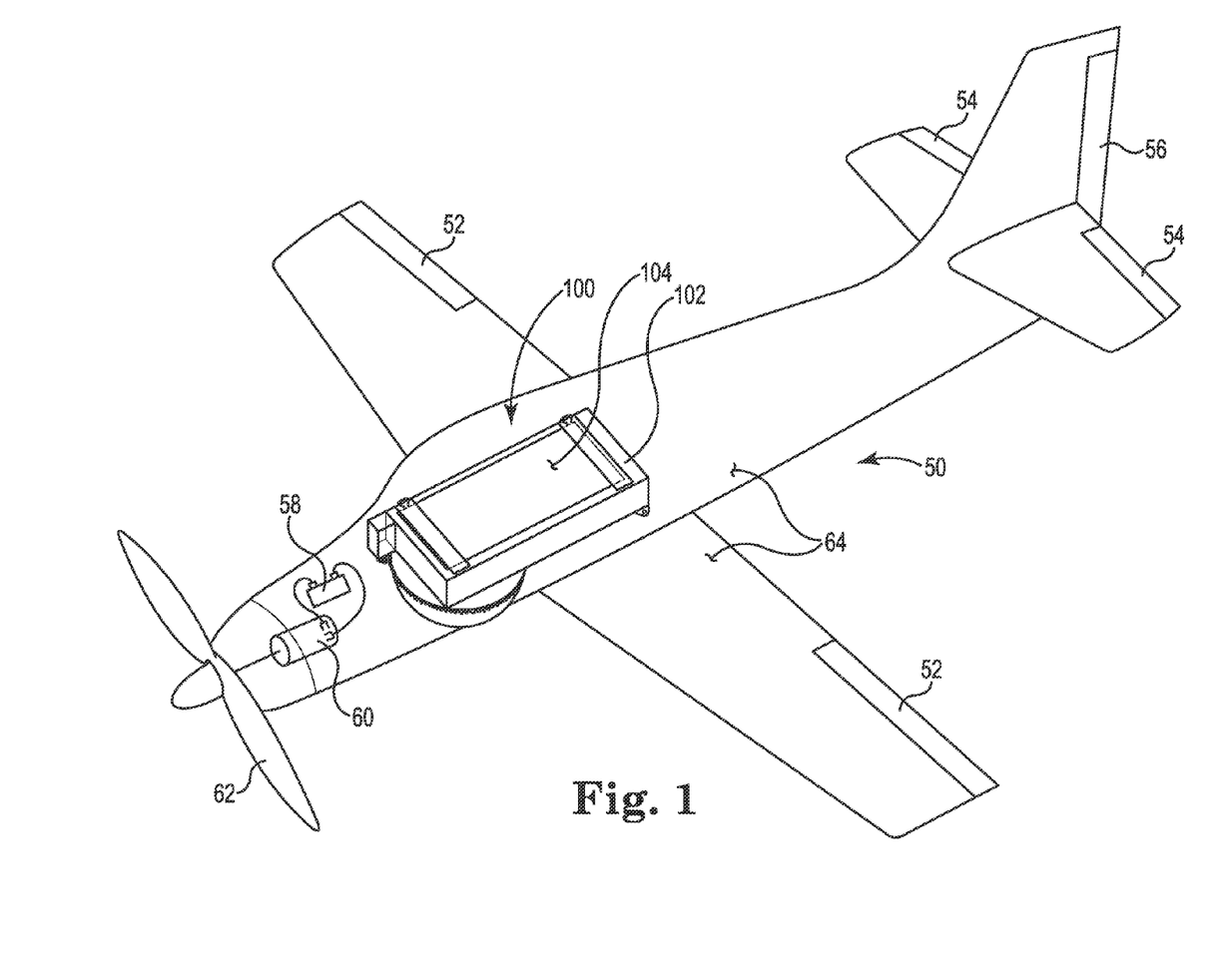
FIG. 1 is a perspective view of an aircraft vehicle with a vehicle control system, according to some embodiments.

Referring now to FIG. 1, a vehicle 50 is shown with a vehicle control system 100. As shown, the vehicle 50 may include a mount 102 for a smartphone 104, for example. The vehicle 50 may also include a frame or body 64 and a directional control assembly supported off of the frame 64. The directional control assembly may include directional devices such as ailerons 52, elevators 54, and a rudder 56 and the vehicle may include a power supply 58, a motor 60 and a propulsion system 62. The several devices of the vehicle 50 may include servos and/or motors for controlling the respective devices. The vehicle control system 100 may include an electronics system 106 (not shown in FIG. 1) configured to place the smartphone 104 in controlling communication with the directional control assembly. As such, the vehicle 50 shown may be adapted for unmanned control of the directional control assembly by the smartphone 104 thereby establishing an unmanned vehicle control system.

Smartphone

The system 100 may be compatible with any smartphone 104, particularly where the smartphone 104 includes a three-axis accelerometer, three-axis gyroscope, magnetometer, barometer, CPU, ability to run user-loaded software, an interface for accessories, and a broadband wireless internet link. Almost every smartphone 104 contains these capabilities, including smartphones 104 based on Android, iOS, Windows Mobile, Blackberry, and other operating systems. The differences between smartphone families typically lies in software with relatively small differences in hardware, such as iPhone's unique USB connector. The integration of an internal barometer in smartphones 104 is becoming more common and is currently supported by the Nexus and Galaxy lines of Android smartphones and other models. The software for the system 100 can be implemented for any smartphone operating system. In one embodiment, the smartphone may include an accelerometer, a gyroscope, a GPS and an ability to utilize a host connection and a magnetometer, barometer, and data link might not be provided.

In one embodiment, the system 100 is designed for an Android-based smartphone 104 running Android operating system version (OS) 3.1. This version of the operating system supports Android Open Accessory mode, which may simplify the software design for the system to connect with external devices. The Android operating system also has an open-source architecture, a well-documented software development kit (SDK), the industry-leading user base, and offers the most flexibility for future customization of the system. Most, if not all, Android OS 3.1 or higher smartphones 104 support attachment of external USB devices via a host connection such as a USB On The Go (USB OTG) protocol and cable. USB OTG protocol allows the smartphone 104, which usually functions as a USB slave device when plugged into a PC, to function as a USB host device for attached accessories. When connected via USB OTG or other host connection 108, the mount 102 may turn the entire vehicle 50 or aircraft and sensors into a plug and play USB accessory for the smartphone 104.

Mount

Figure 2A:
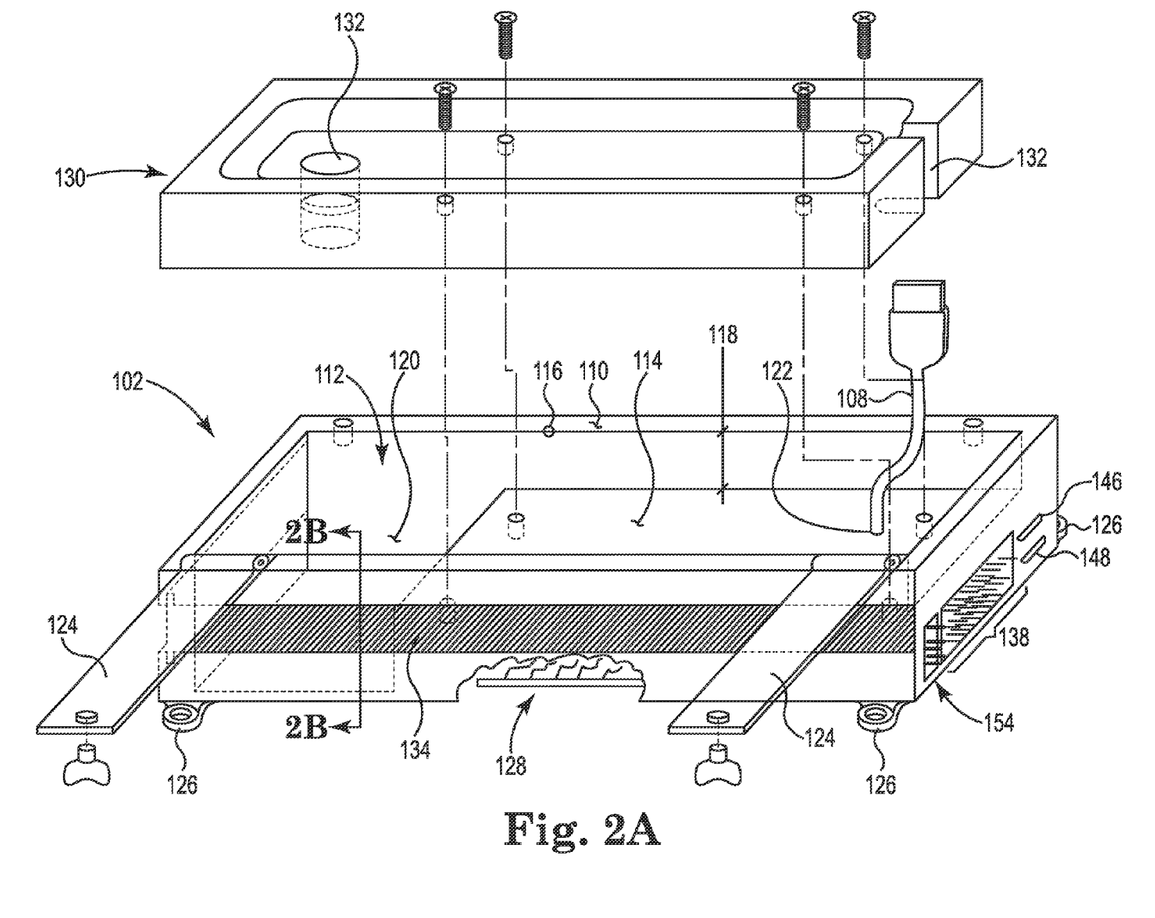
FIG. 2A is a perspective view of a mount for a controller for a vehicle control system, according to some embodiments.

Referring now to FIG. 2, one embodiment of a mount 102 is shown. The mount 102 may be a relatively simple component that can be mass produced at low cost. The mount 102 may be configured for relatively rigid attachment of a smartphone 104, for example, to a vehicle frame 64 or airframe 64 such that the smartphone 104 may experience the same or similar acceleration and rotation rates as the airframe 64 to which it is attached. The mount 102 may include electronic and physical components for interfacing the smartphone 104 with the vehicle or aircraft 50.

As an initial overview of one or more embodiments, the mount 102 may include a rigid design and standard sizes and fittings for secure attachment of the mount 102 to an airframe 64. A data connection may be provided between the smartphone 104 and the mount 102 and a bus providing standardized physical, electrical, and data connections to sensors and external devices may be provided. An external power connection to the mount 102 with standardized physical and electrical outputs to flight controls, throttles, and other physical devices may also be included. In some embodiments, an optional integrated device for altitude determination such as a barometer or sonar transducer may also be provided by the mount 102. Several of these aspects of the mount 102 may be described in with respect to the electronic and physical components of the mount.

Mount Physical Components

With respect to physical components, the mount 102 may include a body portion 110 configured for attachment to a smartphone 104 or other sensing and computing device. In some embodiments, the body portion 110 may include a recessed area 112 with a floor 114 where the recessed area 112 is adapted for nestably receiving a smartphone 104 therein. The recessed area 112 may include a boundary 116 adapted to be just slightly larger than a smartphone 104 and a depth 118 slightly deeper or the same as the thickness of a smartphone 104. In some embodiments, the depth 118 may be less than the thickness. In some embodiments, the boundary 116 of the recessed area 112 may be relatively larger than the smartphone 104 in one or more directions to accommodate electrical and/or communicative connections to ports on the smartphone 104. For example, such boundary adjustments may be made where connections to the smartphone 104 are arranged on a side, bottom, or top of the smartphone. In other embodiments, an additional cavity in the floor of the recess may be provided where connections are arranged on a back of the smartphone 104.

The floor 114 of the recessed area 112 may include a thickness equal to the amount of thickness of the body 110 remaining (i.e., after the depth 118 of the recess is removed) or a lesser floor thickness may be provided. Where a lesser floor thickness is provided, a plurality of ribs may be provided under the floor 114 for reinforcing the floor 114 and suitably supporting the smartphone 104. At one end of the recessed area 112, a cutout 120 in the floor 114 may be provided for accommodating a camera of the smartphone 104 that may face generally downward or into the mount 102. At an opposing end of the recessed area 112, an additional cutout 122 in the floor 114 may be provided for accommodating passing through of electronics, communication lines, or other features. The body portion 110 may include securing straps, bands, ties, or other securing devices 124 for securing the smartphone 104 in the recessed area. As such, a smartphone 104 may be securely seated in the mount 102 and secured to the mount 102 so as to experience motions consistent with the motions experienced by the mount 102.

The mount 102 may also include fastener features 126 such as lugs, tabs, or other features for secured attachment of the mount 102 to a vehicle 50 or airframe 64. The fastener features 126 may include holes for receiving bolts, screws, or other fasteners such that the mount 102 may be rigidly secured to the user's airframe 64 of choice. In some embodiments, the location of the fastener features 126 may be standardized such that the mounts 102 are interchangeable between airframes 64 that share a common interface control document (ICD). In some embodiments, resilient pads may be provide and arranged at the fastener feature locations to reduce vibrations transmitted through the mount 102. For example, the pads may be arranged such that they are compressed between the mount 102 and the airframe 64 when the fasteners are tightened. In some further embodiments, the fasteners may be isolated with resilient pads as well. For example, resilient washers may be provided and/or the bore may be lined with resilient material. Still other vibration isolation systems and/or devices may be used.

In some embodiments, the mount 102 may include a rigid and/or tough plastic material with a relatively high strength to weight ratio. In some embodiments, the mount 102 may be constructed from, acrylonitrile butadiene styrene (ABS) plastic. In other embodiments, the mount 102 may be constructed from other plastics or polymer materials or lightweight metals such as aluminum or composite materials may be used. Still other materials may also be used. The mount 102 can be molded, printed, milled, or otherwise fabricated using common methods.

In some embodiments, the mount 102 may include an internal space or electronics bay 128 to provide room for the electronics and wiring. The electronics such as a USB hub, a pair of servo controllers, and two USB ports, for example, may be secured to the mount 102 with bolts and screws allowing easy assembly and secure connections. Rubber or foam pads at the component connection points may be used to reduce vibration from the mount 102 to the electrical components and help prevent damage to the wiring over time. The internal electronics may be solid state devices as described in more detail below and might not normally be accessed by the user. In some embodiments, the internal electronics may be accessed through a removable cover attached with removable fasteners such as bolts or screws over the electronics bay 128. For example, an access panel may be provided on the back side of the mount 102 for accessing the electronics bay.

In some embodiments, the mount 102 may be relatively dimensionally generic with respect to a wide array of smartphones 104 and an insert 130 may be used that is adapted to receive a particular smartphone 104 and/or model and further engage the recess 112 or other holding feature of the mount 102. In this manner, the mount 102 may be the same and/or similar when used with several differing smartphones 104 and a plurality of inserts 130 may be available to accommodate differing smartphones 104. As shown in FIG. 2, the inserts 130 may be constructed in various shapes to accommodate a user's preferred model of smartphone 104 and may include openings 132 and or other features particularly arranged to accommodate power buttons, volume controls, speakers, cameras, communication connections and other external features of the particular smartphone model. The inserts 130 may be constructed from a relatively rigid material that may be secured to the mount core with screws, bolts, or other types of removable fasteners. In other embodiments, the inserts 130 may fit onto the phone 104 with a friction fit and nestably engage the recess 112 in the mount 102. The straps or other holding devices 124 on the mount 102 may then be used to secure the smartphone 104 and insert 130 in the recess 112 without the need for fasteners particularly for the insert 130.

The insert 130 may include a thin layer of vibration dampening material such as urethane foam or rubber on its top and bottom side to reduce airframe vibrations transmitting into the smartphone's accelerometers and sensors. In one embodiment, a universal insert 130 that contains a layer of low-resilience polyurethane foam (memory foam) that molds to most any smartphone 104 may be provided as another suitable method of securing the smartphone 104. In other embodiments, the mount 102 may not include an insert 130 and may be capable of securing a smartphone 104 of almost any size. The connection of the insert 130 in the mount 102 may be configured to be relatively rigid so as to transmit the forces and torques from the airframe 64 into the smartphone's case such that motions are sensed by the accelerometers and gyroscopes. The smartphone 104 may be placed by the user inside the insert 130 and secured with the holding devices 124 made of metal or other suitable rigid material that may also have a thin layer of vibration dampening foam or rubber on the surface touching the smartphone 104. The holding devices 124 may be adapted to cover relatively small portions of the smartphone 104 touchscreen so the user can maintain the ability to interact with the phone 104 via the touch screen to setup software, initialize systems, and/or control other settings with the phone 104 while it is secured inside the mount 102. Other suitable holding devices for securing the smartphone 104 within the mount 102 include straps, hook and loop, such as Velcro®, or tabs.

Figure 2B:
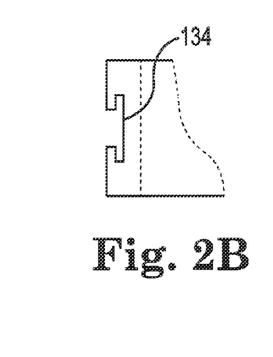
FIG. 2B is a cross-sectional view of a portion of the mount of FIG. 2A, according to some embodiments.
Figures 4A, 4B:
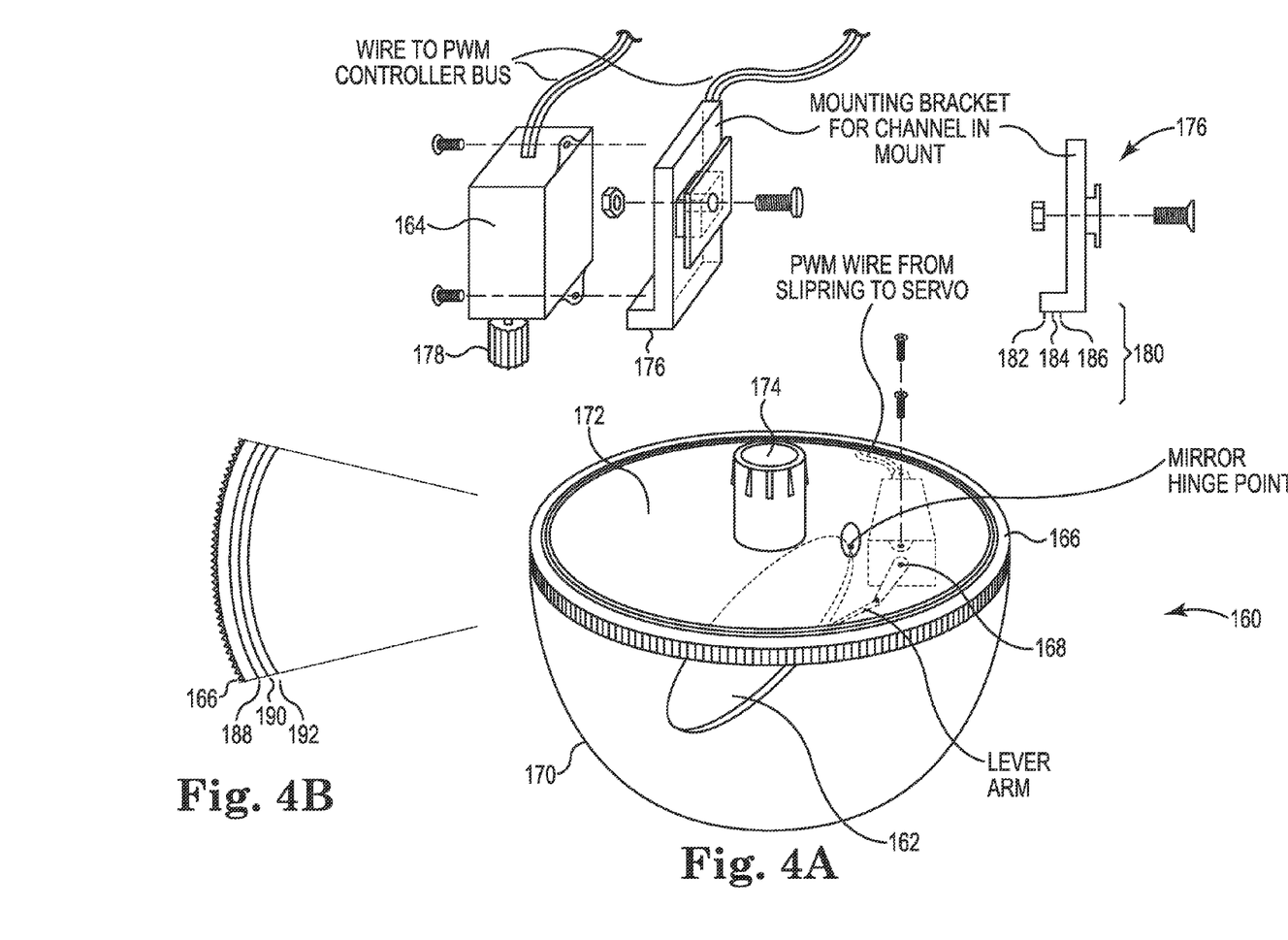
FIG. 4A is a perspective view of a turret of a vehicle control system, according to some embodiments.
FIG. 4B is a close-up top view of a portion of the turret of FIG. 4A.

As will be described in more detail with respect to FIGS. 4A and 4B, a turret device may also be provided and a servo and contacts may be provided on one or more brackets for interacting with the turret device. The brackets may be secured to the mount 102 along the longitudinal sides of the mount 102 or along the top end of the mount 102. As such, and as shown in FIG. 2B, a recessed slot or channel 134 may be provided along the length of the mount 102 for purposes of securing the bracket or brackets.

Mount Electrical Components

Figure 3:
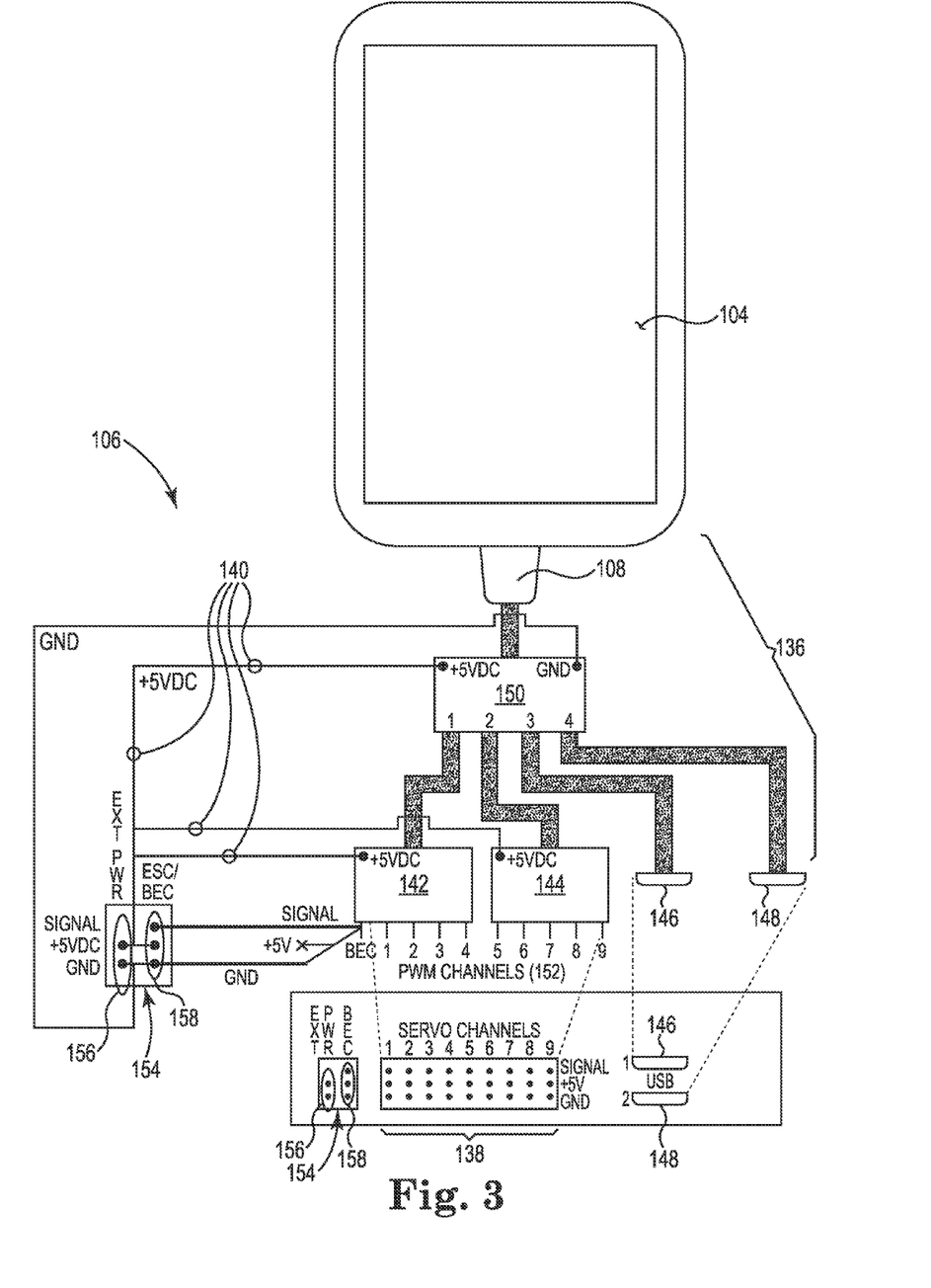
FIG. 3 is a schematic diagram of electronics of a vehicle control system, according to some embodiments.

With respect to the electronic connections between the smartphone 104 and the vehicle 50 and airframe 64, we continue with reference to FIG. 2 and further refer to FIG. 3, which shows a detailed schematic diagram of the electronics of the system. In the embodiment shown, the mount 102 may include three buses: a serial bus 136, a Pulse Width Modulation (PWM) controller bus 138, and a 5V DC electrical bus 140 for powering the serial and controller buses 136, 138. In the embodiment shown, the serial bus 136 is a USB 2.0 bus and is called the USB bus 136. In other embodiments, the USB bus 136 may include a bridge interface to another serial device bus such as Universal Asynchronous Receiver/Transmitter (UART), Inter-Integrated Circuit (I2C), or others protocols. In still other embodiments, the serial bus may use another serial protocol entirely instead of USB. These other serial protocols have useful applications, but may be generally more complicated to use than USB. The USB 2.0 bus 136 may be compatible with any other USB compliant device and the PWM controller bus 138 is compatible with nearly all existing servos and electronic speed controllers (ESC). Each of the USB bus 136, PWM bus 138, and electrical bus 140 are described in more detail below.

USB Bus

Beginning with the USB bus 136, the bus 136 is shown as a series of USB elements and connections arranged between the smartphone 104 and a pair of servo controllers 142, 144 and USB ports 146, 148. In particular a host connection 108 such as a USB OTG cable may connect the smartphone 104 to a USB hub 150 and a pair of servo controllers 142, 144 may be connected to the hub 150. In addition, a pair of USB ports 146, 148 may also be connected to the USB hub 150. While shown schematically in FIG. 3, this series of elements may be generally housed by the mount 102 in an electronic bay 128, for example and the pins of the servo controllers 142, 144 as well as the USB ports 146, 148 may be exposed on a surface of the mount 102 for connection of other devices.

With respect to the connection of the smartphone 104 to the USB hub 150, as discussed briefly in the description of the smartphone 104 above, the smartphone 104 may be in communication with the mount 102 via a host connection 108 such as a USB OTG cable, for example. As also mentioned, such a host connection 108 cable and associated protocol may allow the smartphone 104, which usually functions as a USB slave device when plugged into a PC, to function as a USB host device for attached accessories. Accordingly, the smartphone 104 may rely on this host connection 108 to control devices and/or systems that are placed in communication with the smartphone 104 via this connection. The host connection 108 may include a USB OTG cable or another host connection 108 may be provided.

In one embodiment, a USB OTG cable may include a male micro-B USB plug on one end for plugging into a suitable micro-B USB port on the smartphone 104. The other end of the OTG cable may be hardwired to a USB Hub 150 as shown in FIG. 3 and within an electronics bay 128 of the mount 102 as shown in FIG. 2, for example. Still other host connections 108 including other cable configurations, docking stations, plugs, and wireless connections, may be provided to allow the smartphone 104 to be placed in hosting relationship and in electrical and/or signal communication with the mount 102. For example, in some embodiments, the mount may use an adapter or different cable to connect other types of smartphones 104 such as the iPhone to the USB 2.0 bus. In other embodiments, the mount 102 may support USB 3.0 and SuperSpeed OTG connections. In still other embodiments, while the smartphone 104 may be secured to the vehicle 50 or frame 64, the smartphone 104 may be in wireless communication with the electronics of the vehicle 50.

As mentioned, the host connection 108 configured for plugging into the smartphone 104 may be connected to a USB hub 150, which may be arranged within an electronic bay 128 of the mount 102, for example. In some embodiments, the USB hub 150 may include a micro sized circuit allowing for connection of the host connection 108 and may include four additional ports. Still other numbers of ports may also be provided. In one example, the USB hub 150 may be a Yoctopuce Micro-USB-Hub as shown and described at http://www.yoctopuce.com/EN/products/extensions-and-networking/micro-usb-hub. The mentioned hub 150 may include four USB outlets. As shown in FIG. 3, two of the four outputs may have their Micro-B USB outlets removed and be wired directly to controllers 142, 144. For example the controllers 142, 144 may be servo controllers particularly adapted for controlling radio controlled (RC) systems and devices. The two re-wired ports may be wired to Yoctopuce Yocto-Servo 5-channel controllers 142, 144. An example of a controller 142, 144 may include the controllers described at http://www.yoctopuce.com/EN/products/usb-actuators/yocto-servo. As also shown in FIG. 3, the two remaining ports of the USB hub 150 may each be wired to an external USB port 146, 148 with a Micro-B female connector for user peripherals. For example, the USB ports 146, 148 may be used for attachment of external sensors and devices by the user and allow the system to be flexible and expandable for additional tasks, applications, and projects. While two USB ports 146, 148 have been shown, fewer or additional USB ports may be provided and supported by a different hub design.

The particular hub 150 and servo controllers 142, 144 mentioned may include downloadable software libraries for Android, and have been tested with multiple models of Android smartphones, and are relatively simple to interface with the smartphone operating system. Other embodiments may include any other small USB-compliant hub, other USB servo controllers such as the Pololu Micro Maestro, or different types of compliant USB ports. Still further, where a USB-based architecture is not used, other hubs and controllers may also be used. In the described embodiment, a USB-based architecture is implemented because of its high flexibility, simple integration of devices, and greater user familiarity. However, other embodiments could use another peripheral device architecture such as I2C, UART, or others.

PWM Bus

Turning now to the PWM bus 138, in one embodiment, as mentioned, two servo controllers 142, 144 may be provided and may be in communication with the USB hub 150. With reference to FIG. 2, the servo controllers may be arranged within the electronics bay 128 of the mount 102 and may have a series of pins exposed on the mount 102 for connecting devices to be controlled. Together, and as viewed from above and from the front in FIG. 3, the two servo controllers 142, 144 may provide a PWM bus including 10 channels 152 of PWM output to servos and electronic speed controllers (ESC). It is noted that for considerations relating to the power bus 140 (discussed below), one of the ten channels 152 is shown as being rewired leaving nine channels 152 available at the servo controllers 142, 144 and another channel 152 (i.e., connector 158 described below) available as part of an external power connector 154. Each of the channels 152 may include three 0.1" standard male connectors. When viewed from the front near the bottom of FIG. 3 and as shown in perspective view of FIG. 1, a top pin may be configured for a PWM signal, a middle pin may be configured for +5V DC, and a bottom pin may be configured as a ground. The PWM signal may control the position and/or speed of the servo or motor, the +5V DC pin may supply power to operate the servos, and the ground may provide a reference voltage and return path for the electrical system. Together, each of these sets of pins may comprise a series of channels 152 forming the PWM bus 138 and allowing a variety of servo devices and other equipment to be connected to each channel 138 (i.e., a series of three of the pins in the array). As such, the servo controller 142, 144 may be configured with software programmed to control the respective channels 152 of the controller 142, 144 and, thus, the respective devices connected to the channels 152.

In a typical aircraft configuration, one channel 152 (for example connector 158 described in more detail below) may be used for control of an ESC connected to a brushless electric motor 60, two channels 152 may be used for the left and right ailerons 52, one channel 152 may be used for the elevator 54, and one channel 152 may be used for the rudder 56. As such, 5 of the available 10 channels 152 may be used. In a helicopter, one channel 152 (for example connector 158 described in more detail below) may be used for the main rotor ESC, one channel 152 may be used for tail rotor control, two channels 152 may be used for the cyclic, and one channel 152 may be used for the collective. As such, 5 of the 10 available channels 152 may be used. In multicopters, one channel 152 may be used for each of the motors' ESCs, thereby adding to the number of channels 152 used.

Given the available channels 152 in the PWM bus 138 and the flexibility to control each of the channels 152 in a particular manner, the mount 102 may be moved between various airframes, quadcopters, helicopters, and multicopters with no physical modification. Rather, an update to the software on the smartphone 104 that is connected to the mount 102 may be sufficient to allow for the various vehicles to be controlled. In the described embodiment, 9 channels 152 have been provided to allow for expansion for larger airframes, multicopters, mechanical subsystems for sensors, and other devices. In other embodiments, the number of PWM channels 152 may be fewer or more channels 152 may be provided. In still other embodiments, the controllers 142, 144 may use different protocol than PWM to control electromechanical servos and electronic motor controllers. However, one advantage of the described system is that it may allow the average RC aircraft enthusiast to replace his or her line-of-sight transmitter and receiver system with this system with almost no modifications to the airframe.

Electrical Power Bus

Turning now to the electrical power bus 140, such may be configured to power the previously described USB bus 136 and the PWM bus 138. The devices connected to either of the USB bus 136 and PWM bus 138 may thus be powered by these respective buses 136, 138 as well.

As shown in FIGS. 2 and 3, the mount may include an input 156 for external power. By way of background, in RC aircraft, helicopter, and multicopter applications, the receiver and servos may be powered by either a receiver battery that provides 5V DC or the receiver and servos may be powered by a battery eliminator circuit (BEC) built into most ESCs that provides a continuous 5V DC power supply. The BEC may be used to convert the motor battery voltage (typically some multiple of 3.7V for lithium polymer battery cells) to the 5V used by most servos and receivers. If the motor battery has a voltage higher than 5V, the BEC may generate substantial heat that should be dissipated, usually through air cooling, and the aircraft is often better served by a stand-alone receiver battery or a more efficient voltage converter. In multicopters and airframes with multiple ESCs, it is common to connect only one BEC to the receiver or control board and disconnect the +5V wire on the remainder of the BEC connectors before attaching to the controller bus 138. With multiple sources of +5V DC power and significant amperage available, negative effects to the controller can occur. The present mount 102 has been designed to support all common airframe and system power configurations to maximize flexibility.

Given the above background, in one embodiment, the pins of the first channel 152 of the PWM bus 138 may be removed and rewired into an external power interface 154 that has two connectors as shown in FIG. 3. The first connector 156 may include two 0.1" male pins; one for +5V DC and one for ground where the two pins are configured for connection to an external power 5V DC voltage regulator or battery. The second connector 158 may include three 0.1" male pins; the top pin may be for a PWM control signal wired in parallel to the first channel 152 of the servo controller 142; the middle pin may be wired in parallel to the +5V pin of the first external power connector 156; and the bottom pin may be wired in parallel to the ground of the first channel 152 of the servo controller 142. As such, the second connector 158 may replace the rewired channel on the servo controller making 10 channels 152 available. All of the components may share a common ground, and the bottom pin may alternatively be wired in parallel to the ground pin of the external power connector 156. The +5V DC pins of the external power interface 154 may then be wired to the USB hub 150 and the servo controllers' external power pins. This configuration may help to protect the USB servo controller 142 from damage that may otherwise be caused by connecting a high amperage DC power source to the wrong side of the servo connector bus 138 while also providing a PWM channel for an ESC (or servo) and a reliable source of external power to the USB bus 136 and servo controller bus 138.

In one embodiment, the smartphone 104 may rely on its own internal battery for powering the smartphone 104 to run associated software and issue control signals. In other embodiments, the mount may be configured to power the smartphone 104 from the externally powered USB hub 150.

Optical Turret Device

In some embodiments, the mount 102 may include an option for an optical turret device 160 arranged below the mount 102 as shown in FIG. 1. The turret device 160 may include a mirror 162 set at approximately a 45 degree angle relative to the mount 102 where the mirror 162 may be sized to fill the view angle of the smartphone's camera as it points down. It is to be appreciated that the cutout portion 120 of the floor 114 of the mount 102 together with a suitably arranged orifice 132 in an insert 130 (if present), the camera may be exposed through the bottom of the mount 102. With the mirror 162 positioned directly below the camera, the camera's view angle may be redirected to a direction perpendicular to the smartphone 104 in the direction the mirror 162 is facing. The user can change the direction of the turret 160 in a 360 degree circle by sending a control signal to a servo 164 that drives a gear connected to the geared outer circumference 166 of the turret 160. Another servo 168 may be located inside the turret 160 for adjusting the angle of the mirror 162 and/or flipping the mirror 162 completely out of the field of view of the camera. When the mirror 162 is out of the field of view of the camera, the camera may collect imagery directly below the vehicle 50 unimpeded. The turret assembly 160 may be protected by a thin hemispherical clear polycarbonate dome 170 connected to a turret base 172. The turret assembly 160 may allow a user to view the forward flight path of the vehicle 50, or point the otherwise fixed smartphone camera at a target of interest as the vehicle 50 maneuvers. The mirror 162 may be constructed of a reflective lightweight plastic material such as acrylic to save weight. The optical turret device 160 may rely on two servo channels connected to the controller bus 138, and may be connected and removed from the mount 102 with no permanent modifications. Because the camera position on each smartphone 104 is different, the turret 160 may be held to the mount 102 with a central tubular shaft 174, which is secured with a connector at the opening 132 for the camera on the bottom of the insert 130 designed for each different model of smartphone 104. Accordingly, the center of the turret 160 may be aligned with the camera on the respective smartphone 104. The servo 164 used to turn the turret device 360 degree may be mounted to a bracket assembly 176 that slides along a channel 134 cut into the edge of the mount 102. The servo bracket assembly 176 may be positioned in the channel 134 such that the servo gear 178 intersects with the geared outside circumference 166 of the turret 160 and can turn it. The bracket assembly 176 may also include contacts 180 such as slip ring contact brushes for contacting the slip ring mounted to the turret base 172 to provide an electrical connection to the servo 168 used to flip the mirror 162 aside with the controller bus 138. The slip ring contact brushes may include a ground brush 182, a 5V DC brush 184, and a signal brush 186 each adapted to contact a respective ground ring 188, 5V DC ring 190, and signal ring 192 on the turret base 172. In some embodiments, two brackets 176 may be provided where one bracket 176A is adapted to suspend the servo 164 and gear 178 adjacent the turret 160 to turn it and the other bracket 176B may include the contacts 180 for electrically communicating with the slip ring mounted to the turret base 172. The use of two brackets 176A, 176B may allow each bracket 176A, 176B to be adjusted for its purpose without affecting the other purpose. For example, the first bracket 176A may be adjusted to suitably engage the gears 178 of the servo 164 with the gears 166 of the turret 160 and the second bracket 176B may be adjusted to suitably cause the contacts 180 to be in electrical communication with the slip ring.

Software

Having described the hardware aspects of the system 100 and their relationships, software 200 that may be executed by the smartphone 104 will now be described. The software application 200 loaded onto the smartphone 104 may be used to control the mount 102, aircraft systems, and sensors. The software 200 may function as an inertial navigation system (INS) and may operate integrally with the capabilities of the smartphone 104 to create an adapted device particularly suited for a particular purpose not performable without both the software 200 and the smartphone 104. For example, the software 104 may rely on information electronically and continuously received from smartphone's internal accelerometers, gyroscopes, magnetometer, GPS, and altitude measuring device. In response to such continuous information, the smartphone 104 may continually process the incoming information and react to the information to control the vehicle in a way that only a computing device can. The software 200 may also perform autopilot functions using the INS function and may control aircraft flight systems as needed by the autopilot or user. The software 200 may also provide a physical user interface for all UAS systems. The software 200 may monitor the system 100 and mission status. Still further the software 200 may operate the smartphone camera and any attached sensors and devices. The software 200 may also provide a command and control link and a datalink to a user through the smartphone's broadband wireless modems and the software 200 may provide onboard storage for telemetry and sensor data on the smartphone 104 electronic storage mediums.

The software 200 may be written and configured for any operating system or software application 200, and may be written for iOS, Android, or other mobile operating systems. In one embodiment, the software application 200 may be written for Android operating system version 3.1 or higher because it supports Open Accessory Mode and a wide array of smartphone sensors. Other embodiments may be written in iOS, Windows Mobile, or another operating system with no loss of functionality. Small differences are possible between different smartphones 104 because each vendor may implement slightly different versions of operating systems, but problems resulting from these differences may be accommodated and/or remedied by a software update.

In some embodiments, the software application 200 may include one or more of the following modules: an Inertial Navigation System module 202, an autopilot module 204, controller bus interface module 206, a camera interface module 208, a command/control/data link module 210, a graphical user interface (GUI) module 212, and a ground control station (GCS) module 214. The several modules may be part of a larger software package 200 and each of the modules may be stored on a computer readable storage medium and may be accessible and executable by a central processing unit on the smartphone 102. The software 200 may be configured for particular use on a smartphone 102 due to the interaction and reliance on the several motion and position sensors available on the smartphone 102. The Android operating system may include different software layers, starting with the Linux kernel that interfaces directly with the phone hardware and progressing higher through libraries, an application framework, and further upward to applications. The software 200 for the present system may reside at the application layer and it may be run through a Dalvik Virtual Machine (VM) when started by the user. The software 200 may rely on Android's built-in managers at the application framework layer to access resources and services, to provide the user interface to the system, and to perform functions not included in the operating system. The software 200 may be designed to offer maximum flexibility and opportunity for increased functionality through software updates. The description of the one embodiment of the software 200 may include relatively basic functionality to operate the system, and other embodiments may add new functionality and/or higher levels of sophistication with software updates, for example.

INS

As mentioned, the software 200 may include an Inertial Navigation Module 202 (INS module). The INS module 202 may be implemented by relying on the smartphone's three-axis accelerometer and gyroscope. INS's are generally well understood and, while attempts have been made to implement them on a smartphone, no known INS has been demonstrated on a smartphone that uses an Extended Kalman Filter (EKF) mechanization of the complexity and performance described herein. The EKF formulation is based on the inventor's Master's thesis but has been modified to use position, attitude, and altitude measurements from the smartphone's GPS, magnetometer, and barometer. The INS module 202 also mechanizes an inertial measuring unit (IMU) error model to increase performance due to the smartphone's relatively low quality accelerometer and gyroscope sensors when compared to a purpose-built INS. The inventor's Master's thesis contains a detailed discussion of Extended Kalman Filters and aided inertial navigation systems and should be used for further reference. A copy of the thesis may be found at the University of Texas at Austin library (Malay, Benjamin Peter. Stellar-aided inertial navigation systems on the surface of Mars. M.S. in Engineering Thesis. University of Texas at Austin. OCLC-52770085) and the content of such thesis is hereby incorporated by reference herein in its entirety.

Figure 5A:
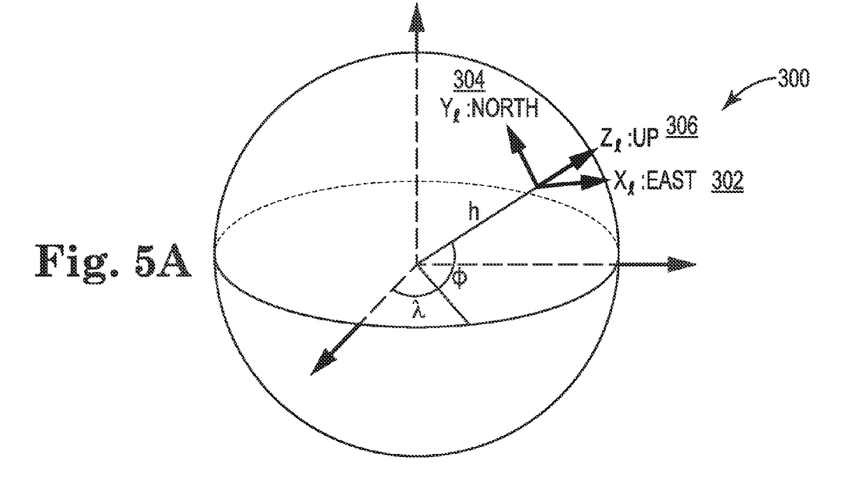
FIG. 5A is a perspective view of a coordinate system used by the vehicle control system, according to some embodiments.
Figure 5B:
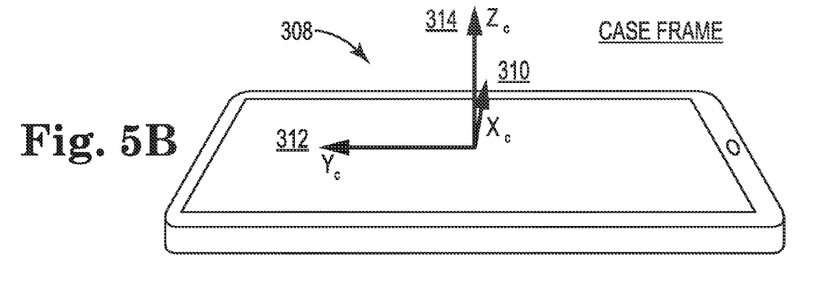
FIG. 5B is a perspective view of a coordinate system used by the vehicle control system, according to some embodiments.
Figure 5C:
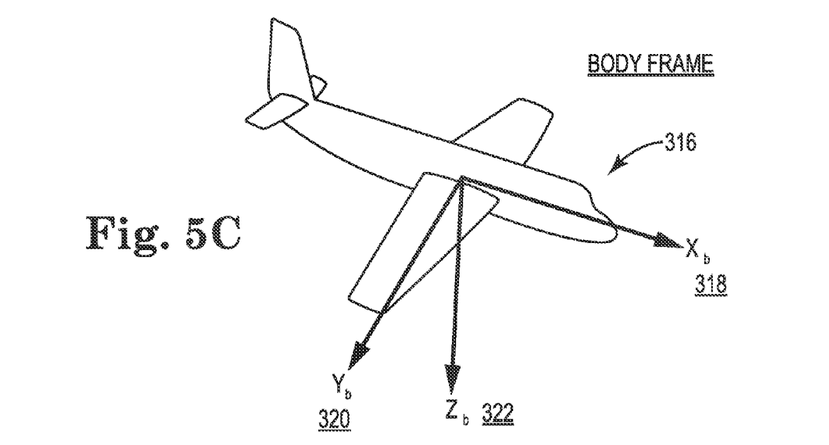
FIG. 5C is a perspective view of a coordinate system used by the vehicle control system, according to some embodiments.
Figure 6:
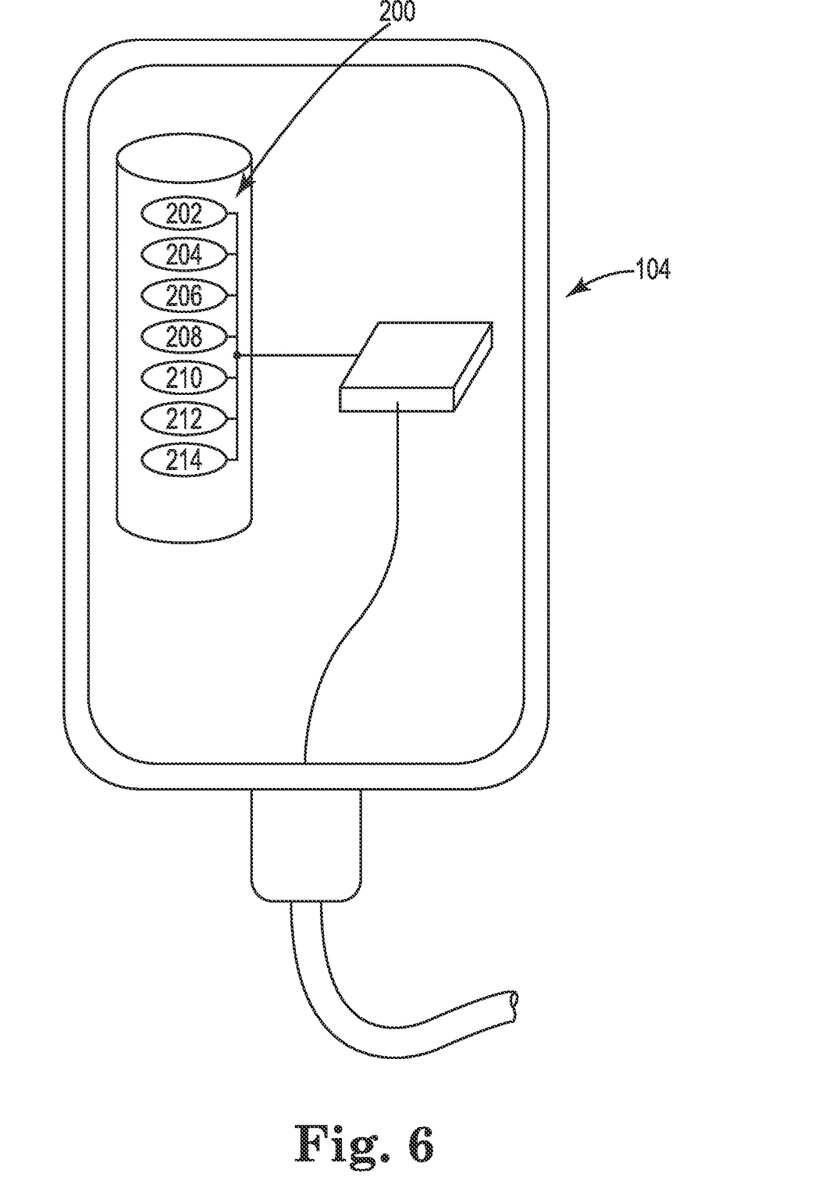
FIG. 6 is a diagram of a smartphone configured for use with the vehicle control system of FIG. 1, according to some embodiments.

A brief definition of the reference frames used by the software may be useful. The INS 202 may be mechanized in a locally level reference frame 300 tied to the center of mass of the air vehicle with reference directions of east ($x_l$) 302, north ($y_l$) 304, and up ($z_l$) 306 as shown in FIG. 5A. As the vehicle moves in latitude, longitude, and altitude, the locally level frame moves with it. The smartphone and internal sensors may include their own reference frame called the case frame 308. In the Android operating system, the case frame directions are referenced normal to the screen of the smartphone 104 when oriented in its default position, with axes pointing to the right ($x_c$) 310, to the top of the device ($y_c$) 312, and up from the screen ($z_c$) 314 as shown in FIG. 5B. Air vehicles typically have a body reference frame 316 defined by their roll 318, pitch 320, and yaw 322 axes such that $x_b$ points out the nose, $y_b$ points out the right side, and $z_b$ points down as shown in FIG. 5C. In one embodiment, the mount 102 may be mounted inside the airframe with the smartphone 104 positioned at the center of mass of the vehicle 50 and the case frame 308 aligned as closely as possible with the aircraft's roll 318, pitch 320, and yaw 322 axes. This location of the mount 102 may increase the performance of the INS 202 relative to other positions of the mount 102 and may help to preserve balance of the air vehicle 50. It should be noted that the orientation between the case frame 308 and the body frame 316 may be fixed for a rigid mount 102 and smartphone assembly, and a constant rotation matrix may be used to translate between the two. The body frame 316 may be useful for the autopilot and control function but might not be used in the INS mechanization.

The INS state vector may be defined by latitude, longitude, height above the ellipsoid (altitude), velocity east, velocity north, velocity up, and a four element quaternion to represent attitude of the case frame 308 relative to the navigation frame. The state vector may also include three-dimensional accelerometer and gyroscope errors of non-orthogonality, scale factor, and bias. In one embodiment, the state vector may include three-dimensional magnetometer errors of non-orthogonality, scale factor, and bias. Gravity may be modeled using the formula of Somigliana because of its accuracy and computational ease, but other gravity models such as spherical harmonics may also be used. The state vector may be propagated through integration of the accelerations sensed by the smartphone's three-axis accelerometer. Acceleration may be measured relative to the case frame 308 and may be rotated into the navigation frame before integration. The attitude of the case frame 308 may be propagated with the rotation rate sensed by the smartphone's three-axis gyroscope. The accelerometer and gyroscope values are easily accessed with the Android SensorManager, and in some embodiments, the frequency may be set to SENSOR_DELAY_FASTEST. The state estimate and, equally helpful, the covariance, may be propagated through integration by the application 200. The integration time may be relatively short and may be limited by the frequency of the acceleration and rotation rates generated by the sensors and the performance of the smartphone CPU. The mentioned thesis contains a detailed discussion of the derivation and equations of motion of an INS mechanized in the locally level reference frame described here and such thesis may be referenced for additional details.

Most smartphones include a relatively low-quality accelerometer and gyroscope and, as such, these devices may be said to be relatively noisy. As such, errors in the state estimate may grow relatively rapidly. Therefore, the INS module 202 may be aided by various measurements from the smartphone's other available sensors and location services. For example, measurements may be processed by the application's Extended Kalman Filter and used to provide more accurate and stable state estimates of position, velocity, and attitude. As the position and velocity errors grow due to drift (as indicated by the increasing covariance), the INS 202 may use the smartphone's locations services to provide a direct measurement of position and velocity. Latitude, longitude, and velocity observations that include the measurements' statistical accuracy may be accessed through the Android LocationManager and location services using the smartphone's imbedded GPS and cell tower triangulation capability. The single GPS may not be capable of measuring attitude, but the smartphone's magnetometer sensor can measure attitude information. The magnetic field vector may be received from the Android SensorManager in case frame coordinates, rotated into navigation frame coordinates, and compared to the expected direction of the magnetic field based on the current state position estimate using GeomagneticField function in the Android OS. The magnetic field vector may be processed through the EKF to update the state estimate and covariance. Altitude measurements may be calculated by measuring the ambient air pressure with the barometer sensor using the Android SensorManager and converting the value to an altitude using the barometric formula. Again, this measurement may be processed through the EKF to update the state. In other embodiments, additional measurements to aid the INS 202 via the Extended Kalman Filter may be added to the software 200 as new capabilities are added to smartphones 104 or a new sensor is plugged into the system.

Inertial Navigation Systems mechanized in a level reference frame have been said to be unstable in altitude estimation. Accordingly, the present system may perform better with an altitude measurement that is more stable than, for example, a GPS altitude available from a smartphone. An increasing number of smartphones 104 including the Nexus and Galaxy Android family have a built in barometer that may be used by the INS 202. The advantage of using a smartphone's built-in barometer capability is that it may provide better support for accessing barometer services from the software application 200 and may save weight, power, and cost by not duplicating functionality. Where a particular smartphone 104 does not include a barometer, embodiments may be provided wherein one of the spare USB ports 146, 148 can be used to plug in a USB barometer such as the Dracal USB barometer. An example of such a barometer may be seen at http://www.dracal.com/store/products/pth_01_p/index.php. Other models of barometers may also be used, including very small and inexpensive I2C barometer sensors. In these embodiments, the I2C devices may be connected to the USB bus 136 with a USB to I2C bridge device and may be programmed for use by the smartphone's software application 200. Other embodiments may include an I2C or UART bus that the barometer sensor may connect directly to. Still other embodiments may include a sonar transducer, laser rangefinder, radar altimeter, or other distance measurement device connected to the bottom of the mount 102 with view of the ground to stabilize the altitude estimate of the INS 202.

The software 200 may also include a function for the initial alignment of the INS 202. The process may involve placing the air vehicle in a stationary, level position with the smartphone 104 parallel to the ground. The user may select the alignment mode from the touchscreen or using the data link, and the INS 202 may align itself by comparing the accelerometer vector measurement with the local estimate of gravity based on the GPS position. Magnetometer measurements, zero velocity updates, and GPS position updates may be used to determine heading, further refine the attitude estimate, and initialize position. When the attitude of the state vector converges, the alignment may be complete and the software may notify the user that the INS 202 is ready for flight.

Autopilot

The system 100 may be capable of both autonomous and manually controlled flight with almost any controllable airframe, including aircraft, helicopters, and multicopters. Typically, small unmanned air vehicles are controlled with line of sight radio links where the output of each transmitter channel creates a proportional response to a servo and moves a flight control surface. The feedback loop is completed when the operator physically observes the change in flight path and modifies the control input in response. This process does not work for beyond line-of-sight and autonomous flight, so the software may include a built-in autopilot module 204. Many other unmanned vehicles have implemented autopilots 204 and stability augmentation systems (such as multicopters) into the airframe, and the vehicles may be capable of flying pre-planned flight routes, hold positions, augment manual control with "fly-by-wire," or control other aspects of flight dynamics. For example, the software 200 may use a displacement autopilot system similar to that described in *Flight Stability and Automatic Control* by Robert C. Nelson section 8.4. Displacement autopilots may be used to control the attitude of an air vehicle in reference to the user's desired state. The basic functions may include pitch displacement, roll displacement, yaw displacement, heading displacement, altitude hold, and velocity hold. Displacement autopilots may be well suited for use in small unmanned aircraft systems due to their simplicity and the benign flight environment at relatively slow speeds. The displacement autopilot's basic functions may be combined to produce more complicated useful functions. For example, an air vehicle can be turned to a new direction, such as when going to a new waypoint, by commanding a roll displacement in the proper direction while at the same time commanding a heading change, and as the desired heading is reached, the roll displacement is reset to level. Altitude can be changed by resetting the altitude the autopilot 204 is holding. Velocity is similarly changed by resetting the desired velocity. Autopilots for helicopters and multicopters include additional displacement functions for hovering.

The autopilot 204 may be mechanized in the body frame 308 coordinate system for easy reuse of established flight dynamics algorithms. The feedback loop to the autopilot module 204 may come from the INS module 202. The position, velocity, and attitude of the system 100 may be directly accessible from the state estimate provided by the INS 202. The software 200 may also utilize proportional plus integral plus derivative (PID) controllers in the autopilot 204 to improve and smooth performance. PID controllers rely on angular rate information, typically by using a rate gyro. These values may be calculated by the INS algorithms, but for simplicity, the angular rates may be read directly from the three-axis gyroscopes in the smartphone 104. Because the rates are not integrated by the autopilot calculations like they are by the INS 202, the relatively noisy values may avoid a performance issue. Gyroscope measurements may be in case frame coordinates and may be rotated into body frame coordinates with the constant rotation matrix.

Each type of aircraft may have different physical and stability constants based on their unique design, and autopilots 204 may have varying control gains that balance fast response times with controllability. The autopilot 204 may include the ability to load new constants and control gains for each model of vehicle with a software update specific to that model. In other embodiments, the user may be able to change constants through the user interface 212 for customized applications.

Manual Control

The system may also be capable of manually controlled flight through a joystick or tilt device such as another smartphone or tablet. In one embodiment, the autopilot module 204 is still fully in the control loop during manual control. For example, as the user manipulates the control device, the control inputs may be sent to the autopilot 204 which interprets the commands as variations of the displacement autopilot functions. For example, a user holding a tablet computer may tilt the device to the left, and the angle of the tilt may be sent to the autopilot 204 via the command and control (C2) link. The autopilot module 204 may then implement a roll displacement of the same angle. As the aircraft turns in flight and reaches the desired new heading, the user, seeing the desired direction of the aircraft, may move the tablet back to neutral, which is sent again via the C2 link, and the autopilot module 204 may implement a zero displacement roll angle. The same may be true when the tablet is tilted forward or backward. That is, the autopilot module 204 may implement pitch displacement commands. The user may also be able to engage or disconnect autopilot commands at any time. For example, the user may manually maneuver the vehicle 50 to a position and then implement an autopilot command to begin a turn about a point on the ground while in altitude hold. Conversely, the aircraft may fly a completely autonomous flight plan, but when reaching the destination, the user may be able to engage a manual control to land the vehicle. The autopilot module 204 may also have safety features including returning to point of origin when the C2 link is lost, avoiding restricted airspace, preventing the user from overcontrolling the aircraft, and others. New features and capabilities can easily be added with software updates.

Controller Bus Interface

In one or more embodiments, the software 200 may process control inputs generated by the autopilot module 204 or sent manually by the user and turns them into pulse wave modulation (PWM) signals via the Yocto-Servo controller modules 206. The servos and electronic speed controller(s) sense the signal and move the flight controls using +5V DC power from the controller bus or change throttle settings. The Yocto-Servo has published Android software for generating the PWM signals using simple software commands, and that software is incorporated in the software application 200. While most servos are based on signal ranges from 1000 µs to 2000 µs with a neutral position set at 1500 µs, each airframe 64 used with the UAS system 100 may have different configurations and output values for each controller channel, which is customized through the software 200. In some embodiments, the user may be able to change the configuration and range of signal/position values of the controller channels through the software's user interface 212 which may then update the code 206 controlling the servos.

Camera Interface

The smartphone's integrated camera may offer an advantage for the present system when compared to previous systems. Most smartphone cameras are capable of HD video and take still photographs at over 10 MP resolution, competing with the capability of purpose-built cameras at little to no additional cost or weight. Android also has built in functionality to stream HD video using the H.264 codec over HTTPS. The present system may use this built-in functionality by controlling the camera with a camera module 208 to become a highly-capable remote sensing platform without needing to add an external sensor. The software 200 may automatically flip and rotate the image when the turret mirror 162 is engaged to provide the user with an image in the correct orientation. The software 200 may allow the user on setup to save photographs and video to removable media or stream the images over the data link to a user or ground station.

Command and Control (C2) and Data Link

The system may navigate or fly a preplanned route autonomously with no communication to the user or a ground control station (GCS). In some embodiments, however, the system may use a GCS to control aspects of the system. The system may connect to the GCS directly with the broadband cellular data link module 210 integrated into the smartphone. This method may allow the user to navigate and/or fly the aircraft beyond line-of-sight, maintain control over the vehicle, and stream sensor data in real-time. The cellular data link module 210 may support IP-based communications in a variety of protocols. In some embodiments, HTTPS may be used for security and ease of use, but other embodiments may use User Datagram Protocol (UDP), which is also supported by Android. Control commands may be sent by the GCS to the system 100, and system status, flight data, and sensor data may be sent by the system back to the GCS over the same link. In some embodiments, different types of data may be sent over different types of network protocols.

Broadband cellular networks may introduce a time delay over the C2 link between the GCS and the system 100 which may cause control difficulty without the system's autopilot 202. This may particularly be problematic during the takeoff and landing phases of flight. In some embodiments, the system 100 may also use the smartphone's Wi-Fi modem for much lower latency communications when Wi-Fi is available. The smartphone 104 may be configured to automatically connect when in range to a Wi-Fi router, and takeoff and landing sites may be co-located with a user and Wi-Fi equipped GCS to allow lower-latency control during takeoff and landing phases of flight.

Broadband cellular networks may also introduce an additional difficulty for the system by assigning dynamic IP addresses. If the system 100 is going to connect to a GCS, either the GCS or the smartphone 104 may need a static IP address to establish communications. This may be relatively simple, technically, but may be expensive for the average user. In some embodiments, the system 100 and the GCS may both connect to an Internet server architecture for the digital handshaking to establish a communications link, similar to the popular Skype application. Communications across the server architecture may be encrypted to protect the system 100 from unauthorized control and to protect the sensor data traversing the link from unauthorized access.

Graphical User Interface

The software 200 may contain a graphical user interface (GUI) 212 with touchscreen controls for accessing the configuration, setup, system status, flight planning, initialization, and managing stored sensor data. The Android operating system contains many ready-built functions through the application managers that are leveraged by the software 200. A suitable version of the software 200 may be loaded onto the smartphone 104 and the user may run the application 200 and load the desired configuration files for the airframe 64 being used. The user may also plug the smartphone 104 into the USB OTG cable in the mount 102 where the mount 102 may be recognized as a valid USB device and the user may grant permission to connect to the mount 102. The user may set up any desired sensors, storage devices, and may configure the system 100 for travel and/or flight using a menu system with text-based and touchscreen inputs. The software 200 may launch a routine which may conduct a health status check of the subsystems and flight controls, and the user may verify proper operation. The C2 and data links may also be initialized and tested. The user may generate a flight plan using the Google Map interface, for example, or the user may load a previously-built flight plan stored in memory or sent by the ground station. After some or all of the above steps, the vehicle 50 may be ready for flight and may be placed stationary on a level spot, for example. The user may initiate the INS alignment by selecting an corresponding icon on the touchscreen. When the alignment is complete, the GUI 212 and an audible alert may notify the user and the system 100 may start the engine or engines. Helicopters and multicopters may begin flight from the ground, but aircraft are often launched by hand, catapult device, or with a takeoff sequence that places the aircraft in a stable flight mode for the autopilot to take control. When the flight is complete, stored data from the system and sensors may be downloaded via the data link or the smartphone's removable storage device.

Ground Control Station (GCS) Software

Multiple open source ground control station software applications have been built with good functionality. Some GCS software is based on a tablet or smartphone device that allows intuitive tilt control for the average user. Other GCS applications use joystick, keyboard, or other peripherals to control the vehicle 50. Since the system 100 has many possible applications, choice of GCS may be very flexible. A common UAS control protocol called MAVLink may be compatible with multiple available GCS applications including the popular QGround Control GCS and APM Mission Planner. The user may have the option of selecting the MAVLink protocol during setup for command and control of the system. The MAVLink messages may be relatively simple well-formatted text-based messages that can be sent over many types of network links including HTTP and UDP. When MAVLink is selected by the user, the software 200 may build MAVLink compliant messages to send to the GCS, and may decode received MAVLink messages into a format compatible with the software autopilot 204 and control software 206. This may allow the system to be compatible with a number of different GCS software suites, offering the most flexibility to the user. In some embodiments, the system 100 may use a custom-designed GCS software suite. In some embodiments, the GCS software may be able to perform many of the same setup and initialization functions of the software 200 since some users may prefer to do the system setup using a larger screen or additional peripheral devices such as a keyboard or mouse, or the smartphone touchscreen may be tough to access inside the airframe.

The presently described system may be advantageous over previous systems because it leverages the hardware capabilities of the smartphone and combines that with a software-driven solution that is easily modified and updated. Rather than focusing on particular components taken out of smartphones to integrate into small UAVs where many of the capabilities and reliability of an integrated device is lost, the system may instead take advantage of the integrated smartphone that has millions of dollars of research and development behind it and also take advantage of the economy of scale of the smartphone. That is, using smartphone-derived components may allow a similar capability of the present system, but the cost of the individual components combined is more than a brand-new smartphone, not to mention the engineering cost of integrating the components in a unique design. Most of the population already owns one (or more) smartphone, and it may cost the user nothing to utilize an existing smartphone in the system. Even if the user understandably does not want to use their primary personal smartphone in the system, a new or used smartphone could be purchased for less cost than the individual components. Another success of the modern smartphone is the "app" paradigm where software that performs tasks the original smartphone designers never dreamed of can be downloaded and used with the touch of a button by an average user. The system uses a similar architecture where software providing new functionality can be downloaded and used with a touch of button and little to no hardware changes.

Although the present invention has been described with reference to preferred embodiments, persons skilled in the art will recognize that changes may be made in form and detail without departing from the spirit and scope of the invention. In one particular example, while the term GPS has been referenced throughout as referring to a Global Positioning System, other forms of positioning systems that can determine and velocity may also be used. For example, satellite navigation systems such as the Russian GLONASS, the European Galileo, and the Chinese system may be used. While this is a single example, other variations of the parts and pieces of the system may be available and are within the scope of the present disclosure.

What is claimed is:

1. A system of control components for a vehicle, comprising:
a mount secured to the vehicle and configured for rigidly securing a smartphone therein such that motions experienced by the vehicle are correspondingly experienced by the smartphone, and such that an internally defined three-dimensional reference frame of the smartphone is positioned and maintained in substantial alignment with a three-dimensional reference frame of the vehicle such that, at a point in time, the orientation of the internally defined reference frame defines an orientation of the vehicle, allowing the smartphone to autonomously track and control the orientation of the vehicle in three-dimensional space in real-time; and
system electronics arranged on the vehicle and in communication with the smartphone and electromechanical control devices, the system electronics configured to:
receive autonomous control signals from the smartphone for controlling orientation of the vehicle in three-dimensional space, the control signals based on continuously tracked variations of the vehicle orientation from the vehicle orientation defined at the point in time; and
based on the received control signals, control directional devices of the vehicle via the electromechanical control devices.

2. The system of claim 1, wherein the mount further comprises a body portion and a floor and the floor comprises a cutout portion for accommodating a camera of a smartphone.

3. The system of claim 1, wherein the system electronics are incorporated into the mount.

4. The system of claim 1, wherein the system electronics comprises a serial bus, a controller bus, and an electrical power bus.

5. The system of claim 4, wherein the serial bus comprises a host connection for placing the mount and peripheral devices in communication with a smartphone.

6. The system of claim 5, wherein the serial bus comprises a hub in communication with the host connection and comprising a plurality of outlets.

7. The system of claim 6, wherein the plurality of outlets comprises at least one outlet wired directly to a controller.

8. The system of claim 7, wherein the vehicle is an airframe and the electromechanical control device is a servo controller comprising a plurality of channels arranged on a surface of the mount for connecting devices to be controlled.

9. The system of claim 8, wherein the devices to be controlled include servo motors for controlling flight surfaces and throttles.

10. The system of claim 8, wherein the plurality of channels forms the controller bus.

11. The system of claim 10, wherein the controller bus comprises a pulse width modulation bus.

12. The system of claim 7, wherein the plurality of outlets further comprises at least one serial port configured for communication with a peripheral device.

13. The system of claim 4, wherein the electrical power bus comprises an external power connector configured to allow the electrical power bus to be powered by one of a BEC and an external power source.

14. The system of claim 13, wherein the electrical power bus is configured for 5 volts of DC current.

15. The system of claim 14, wherein the electrical power bus is in electrical communication with and provides power to the serial bus and the controller bus.

16. The system of claim 1, further comprising a turret device configured to allow the camera of a smartphone to receive imagery from a plurality of directions.

17. A system of control components for a vehicle, comprising:
a self-contained handheld computing device comprising a computer readable storage medium, a processor, a user interface and an output and comprising an accelerometer, a gyroscope, an attitude sensor, and a positioning system; and computer implemented instructions configured for autonomously controlling navigation of the vehicle performable by the processor and stored on the computer readable storage medium, the instructions comprising:

storing an orientation of a reference frame of the computing device relative to an orientation of a reference frame of the vehicle at a point in time;

electrically receiving in real-time information sensed by at least two of the accelerometer, the gyroscope, the attitude sensor, and the positioning system;

continuously performing real-time error correction of the information received in real-time and sensed by at least one of the accelerometer, gyroscope, attitude sensor, and positioning system;

continuously calculating an orientation of the vehicle, wherein calculating an orientation of the vehicle comprises combining real-time sensed and/or corrected information for at least two of the accelerometer, the gyroscope, the attitude sensor, and the positioning system; and based on the calculated orientation of the vehicle, preparing control signals for transmission to the vehicle to autonomously control navigation of the vehicle in three-dimensional space via electromechanical control devices.

18. The system of claim 17, wherein the computer implemented instructions comprise an inertial navigation system.

19. The system of claim 18, wherein the inertial navigation system comprises an extended kalman filter.

20. The system of claim 17, wherein the computer implemented instructions include an autopilot module.

21. The system of claim 17, wherein the computing device is configured for linking to a broadband network and further configured to receive control information and control the vehicle based on the control information.

22. The system of claim 1, wherein the mount is further configured to position the smartphone at a center of mass of the vehicle.

23. The system of claim 1, wherein the system electronics are further configured to receive control signals from an operator interrupting the autonomous control signals.

24. The system of claim 17, wherein the computer implemented instructions are further configured to allow for interruption of the autonomously controlled navigation by receiving control signals from an operator.

* * * * *